W. E. TRENT.
AGITATING AND MIXING APPARATUS.
APPLICATION FILED JAN. 20, 1912.

1,073,878.

Patented Sept. 23, 1913.

Witnesses
Arthur L. Slee
Harry F. Totten

Inventor
Walter E. Trent
by N. A. Acker
his atty

UNITED STATES PATENT OFFICE.

WALTER E. TRENT, OF RENO, NEVADA.

AGITATING AND MIXING APPARATUS.

1,073,878. Specification of Letters Patent. Patented Sept. 23, 1913.

Application filed January 20, 1912. Serial No. 672,364.

*To all whom it may concern:*

Be it known that I, WALTER E. TRENT, a citizen of the United States, residing at Reno, in the county of Washoe and State of Nevada, have invented certain new and useful Improvements in Agitating and Mixing Apparatus, of which the following is a specification.

The hereinafter described invention relates to improvements in apparatus for agitating, mixing and the aeration of the liquid slimes, clay, cement, slurry and sludge generally; and the principal object being to provide a distributing arm so constructed, and arranged to operate in such a manner as to overcome the objections which are present in the types of devices of this character now in use in which the distributing arms extend radially from the rotatable reservoir.

In the devices now in use, the distributing arms extend radially from the rotatable reservoir and each arm is provided with a series of outlet nozzles extending from the rear surface of the distributing arms, thus, when the apparatus is allowed to remain idle, say, for over night, it will be discovered when it is again desired to rotate the distributing arms, that it is very difficult to do so, as the outlet nozzles will have forced the material against the distributing arm following, and when the agitation of the material has ceased, the heavier particles will have settled around each distributing arm, as the arms in their stationary position will have arrested the flow of material.

My improved device comprises a hollow, convolute distributing arm, provided with a series of outlet nozzles, projecting from the forward surface of the arm and extending in a direction opposite to the travel of the distributing arm.

To comprehend the invention, reference should be had to the accompanying sheet of drawings, wherein—

Figure 1:
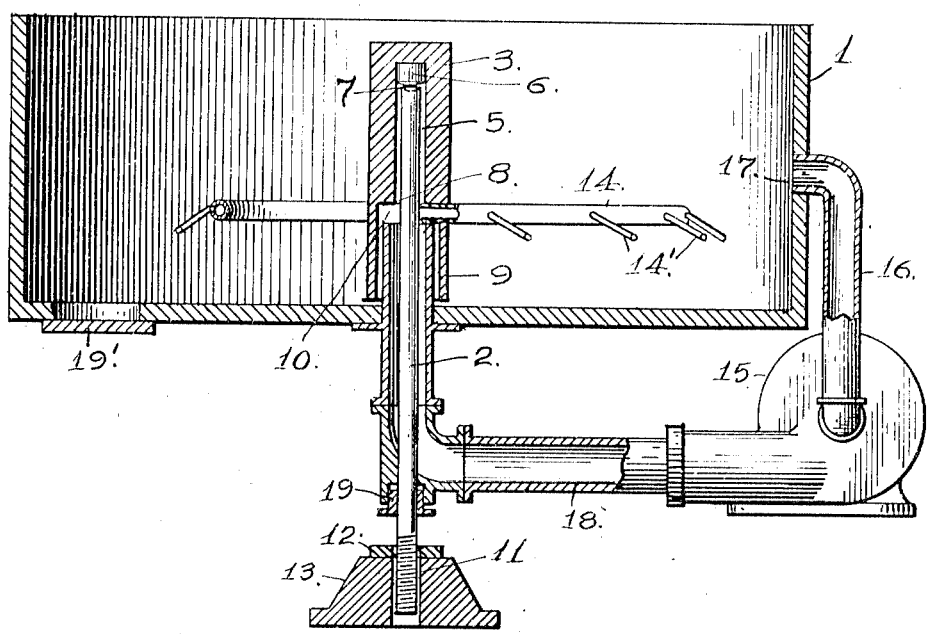
Figure 2:
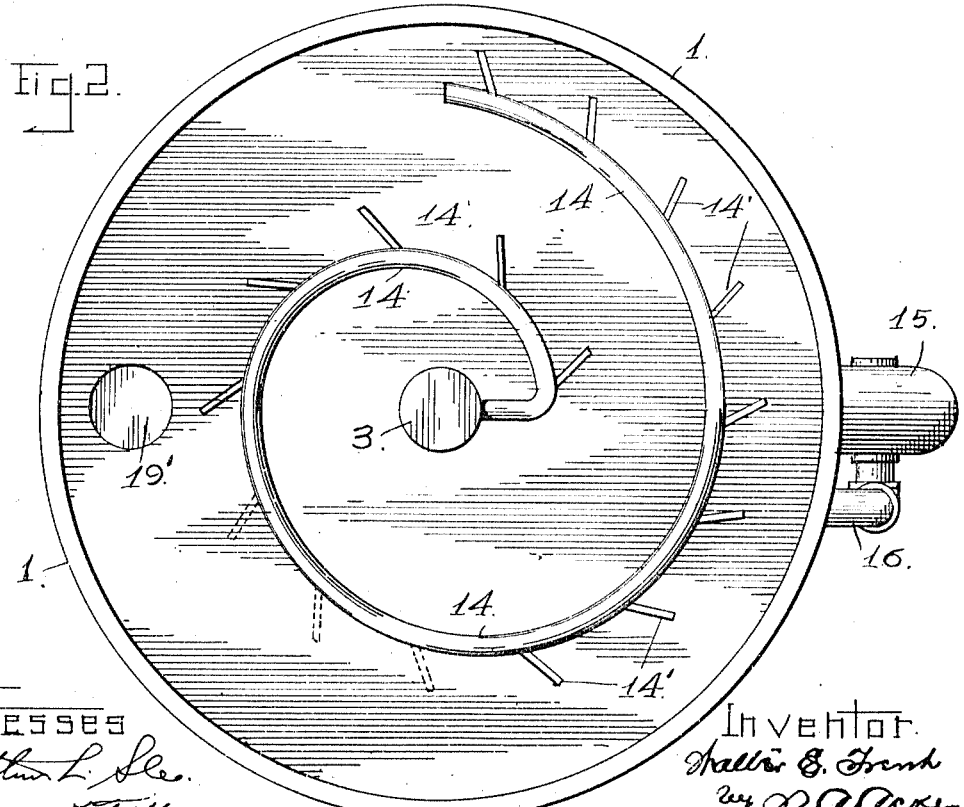

Figure 1 is a vertical sectional view of my improved device, showing the bearing spindle supporting the rotatable reservoir, the convolutely extending arm carried thereby, the direction of the flow of the material into and from the receiver being illustrated by arrows. Fig. 2 is a top plan view of the receiver, disclosing the shape of my improved distributing arm and the arrangement of the distributing nozzles projecting from the forward surface thereof.

Referring more particularly to the drawings, the numeral 1 designates any suitable form of receiving tank, preferably circular in shape, the size depending on the amount of material to be treated. Mounted to rotate about the upper end of a spindle 2 extending vertically through the center of the bottom of the receiving tank 1 is a bearing 3, provided in its center with a cylindrical cut out portion 5 which provides a seat for an anti-friction button 6 carried in a seat 7 on the upper end of the spindle 2. The bearing 3 is provided midway of its length with a stepped portion 8 from the outer edge of which extends a downwardly projecting cylindrical flange 9, the same providing an enlarged chamber 10, hereafter termed a reservoir, the lower edge thereof falling short of touching the bottom of the receiving tank 1. The spindle 2 is provided at its lower end with suitable screw threads 11 adapted to receive a nut or adjusting member 12, which is supported on the upper surface of a hollow supporting plate 13, attached to some permanent structure.

From the above description it will be apparent that an adjustable spindle is provided for the bearing 3, and the bearing may be raised or lowered within the tank as desired.

Extending horizontally from and rotatable with the reservoir 10 and positioned at the junction of the stepped portion 8 and the flange 9, is a hollow, tubular arm 14, convolute in shape, and provided on its forward surface, in the direction of its rotation, with a series of angularly positioned, rearwardly extending, downwardly inclined, outlet nozzles 14' through which the material to be treated is forced in jet streams, in a hereinafter described manner.

The means for circulating the material through the receiving tank and the convolute arm, constitutes a rotary pump 15 operated from any suitable source of power and having its intake connected by a suitable pipe or channel 16, the upper end of which communicates with the interior of the receiving tank as at 17, and the exhaust of said pump is connected by a suitable pipe or channel 18 with the receiving tank 1, the pipe 18 at its outer end surrounding the vertical spindle 2 and extending vertically up through the bottom of the receiving tank 1, inside the flange 9, and terminating short of the point where the distributing arm 14 connects with the bearing 3, as shown in Fig. 1 of the drawings. A suitable packing 19 is provided surrounding the spindle 2 where it enters the pipe 18, in order to prevent any leakage of the material that is being treated.

In operation, the material to be treated is fed into the receiving tank, in any suitable manner, until it overflows the pipe 16 and submerges the tubular arm 14. Motion now being imparted to the pump 15, the material will be drawn in through pipe 16 and forced through pipe 18 into the rotating reservoir or member 10, through the hollow distributing arm 14 and out through the outlet nozzles 14'. Owing to the disposition of the nozzles for the jet streams and the forcing of the liquid therefrom, an impelling action is imparted to the distributing arm 14, carried by the bearing 3, which is supported on the spindle 2, due to the strain or recoil of the escaping jets. The rotation of the horizontally disposed convolute arm 14 within the body of the material contained in the receiving tank, serves to thoroughly agitate and mix the said material or pulp, and by employing the convolute distributing arm and arranging the distributing jets on the front face thereof, the entire area of the receiving tank will be covered upon one revolution of the arm, and the material agitated will not be banked in front of the arm following as the nozzles project from the forward surface of the arm.

From the above description it will be apparent that a complete circulation and agitation of the material is always in progress upon the operation of the pump. After the material has been treated, the same is withdrawn from within the receiving tank in any suitable manner as through the outlet 19'.

Having now fully described my invention what is claimed as new and is desired to protect by Letters Patent is—

1. In an apparatus for the described purpose, the combination with a holding receptacle for the material to be treated, of a reservoir rotatably supported therein, a curved tubular arm extending horizontally therefrom, a series of jet nozzles extending angularly from the forward surface of said arm and arranged at an incline to the horizontal plane thereof, of a circulating pump for the liquid material, of connection between the pump and tank for the withdrawal of the material and connection between the pump and the rotatable reservoir, through which the material entering the pump is forced into the reservoir under pressure.

2. In an apparatus for the described purpose, the combination with a holding receptacle for the material to be treated, of a reservoir rotatably supported therein, a convolute tubular arm extending horizontally therefrom, a series of jet nozzles extending angularly from the forward face of said arm and arranged at a downward inclination to the horizontal plane thereof, of a circulating pump for the liquid material, of connection between the pump and tank for the withdrawal of the material and connection between the pump and the rotatable reservoir, through which the material is forced into the reservoir under pressure.

3. In an apparatus for the described purpose, the combination with a holding receptacle for the material to be treated, of a reservoir rotatably supported therein, a convolute tubular arm extending horizontally therefrom, a series of jet nozzles extending angularly from the forward face of said arm and arranged at an angle to the horizontal plane thereof, of a circulating pump for the liquid material, of connection between the pump and tank for the withdrawal of the material, connection between the pump and the rotatable reservoir, through which the material entering the pump is forced into the reservoir under pressure, and an adjustable spindle extending vertically through the bottom of said receptacle for supporting said reservoir and for raising or lowering the same and the arm carried thereby in the receptacle.

4. In an agitating apparatus for semi-solid liquids, the combination with a receiving receptacle for the solution to be treated, a rotating member provided with an interior chamber supported in said receptacle, a convolute hollow arm projected horizontally from said rotatable member, a plurality of jet nozzles extended from the forward surface of said arm, and means for supplying liquid under pressure into said arm through the rotatable member within the receiving receptacle.

In testimony whereof I have signed my name to this specification in the presence of two subscribing witnesses.

WALTER E. TRENT.

Witnesses:
HARRY A. TOTTEN,
D. B. RICHARDS.